Oct. 29, 1968   J. H. ALLISBAUGH   3,408,652
AERIAL MOUNT
Filed July 13, 1966
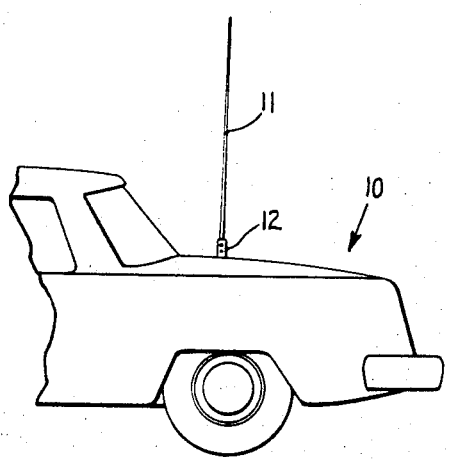
Fig. 1.
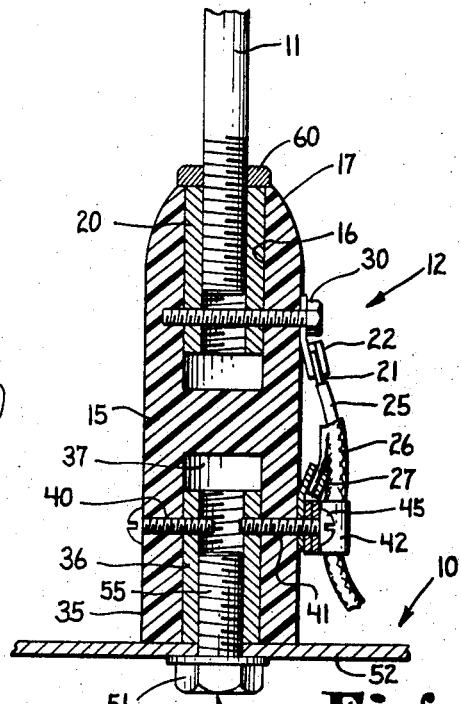
Fig. 2.
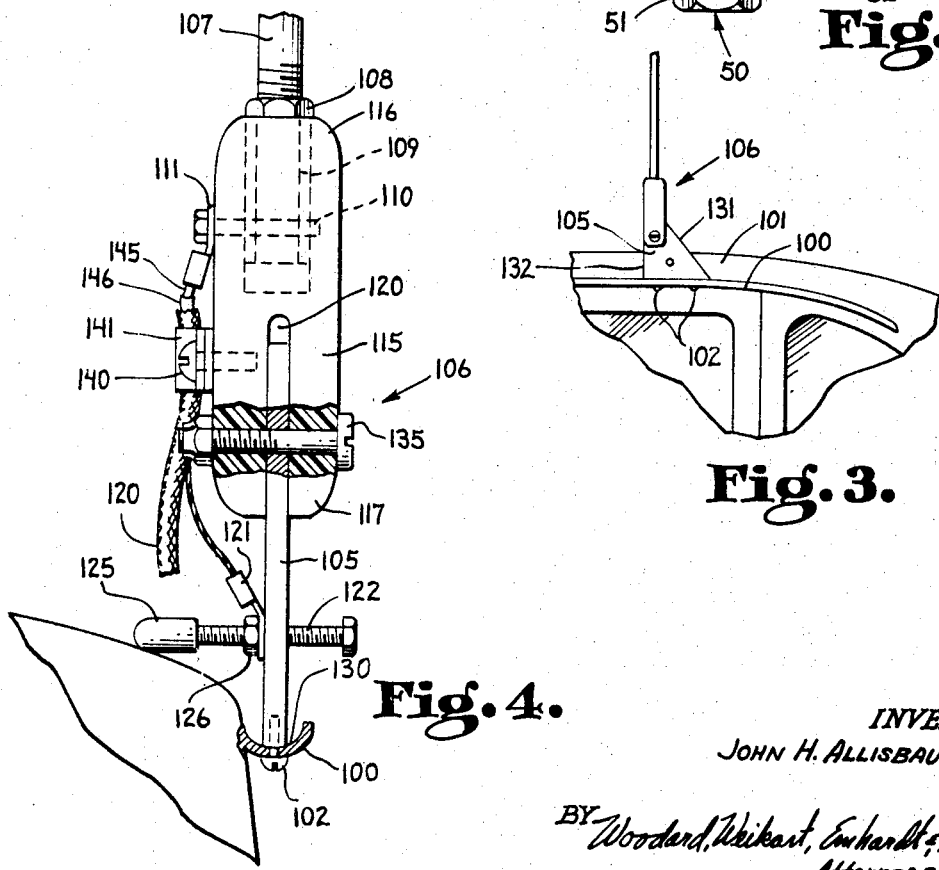
Fig. 3.
Fig. 4.
INVENTOR.
JOHN H. ALLISBAUGH
BY Woodard, Weikart, Emhardt & Naughton
Attorneys

United States Patent Office 3,408,652
Patented Oct. 29, 1968

3,408,652
AERIAL MOUNT
John H. Allisbaugh, 6308 Breamore Road,
Indianapolis, Ind. 46220
Filed July 13, 1966, Ser. No. 564,941
7 Claims. (Cl. 343—715)

The present invention relates to an aerial mount.

With the increasing use of two way radio equipment in automobiles and trucks, it has become necessary to provide more effective and efficient mounting means for the aerials of such transceivers. It is therefore one object of this invention to provide an improved aerial mount. Another object of the invention is to provide an aerial mount which can be manufactured at low cost and can be easily and quickly assembled yet which provides rugged construction capable of long and effective service.

Related objects and advantages will become apparent as the description proceeds.

One embodiment of the present invention might include an aerial mount for an automobile or the like comprising an insulating member having a bore therein, an electrically-conductive internally-threaded sleeve press fitted within said bore, an electrically-conductive enlarged-headed screw threaded into said insulating member and into said sleeve and providing means firmly securing said sleeve to said insulating member, said screw also being operable to secure a terminal on an electrical conductor to said insulating member underneath the head of said screw to provide electrical connection between the electrical conductor and said sleeve, a second enlarged-headed screw threaded into said insulating member, a looped retainer element having opposite ends received under the head of the second screw, said retainer element being adapted to grip a ground sleeve and an insulating covering around said electrical conductor, and means for securing the insulating member to the automobile.

The full nature of the invention will be understood from the accompanying drawings and the following description and claims.

FIG. 1 is a side elevation of the truck of an automobile having the aerial mount of the present invention installed thereon.

FIG. 2 is an axial section of the aerial mount of FIG. 1.

FIG. 3 is a fragmentary side elevation of the roof of an automobile having an alternative embodiment of the present invention installed thereon.

FIG. 4 is an enlarged fragmentary transverse section of the automobile of FIG. 3 also taken through the axis of the aerial mount of FIG. 3 and showing the details thereof.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated an automobile 10 having an aerial 11 mounted thereon by means of the aerial mount 12. The aerial mount includes a generally cylindrical plastic insulating member 15 having a bore 16 formed coaxially therein. The insulating member 15 is rounded off at its end 17 and has an internally-threaded sleeve 20 press fitted in the bore 16. The sleeve 20 is formed of electrically-conductive material such as brass or the like while the insulating member 15 may be formed of any suitable plastic such as, for example, the plastic known by the trademark "Delrin" and manufactured by the Du Pont Company.

The transceiver used in connection with the aerial 11 includes a conductor 21 which leads to the aerial and has a terminal 22 secured to its end. The conductor 21 is surrounded by an insulating covering 25 which is in turn surrounded by a ground sleeve 26. The ground sleeve 26 has a terminal 27 secured thereto.

An electrically-conductive enlarged-headed screw 30 is threaded into the insulating member 15 and into the sleeve 20 and provides means firmly securing the sleeve to the insulating member. It will be noted that the screw 30 extends perpendicularly to the axis of the member 20 and also extends through the sleeve 20. The enlarged head of the screw 30 has the terminal 22 secured thereunder whereby effective electrical connection is provided between the aerial 11, the sleeve 20, the screw 30, the terminal 22 and the conductor 21.

The insulating member 15 has press fitted in its opposite end 35 an internally-threaded sleeve 36. The sleeve 36 is received within a suitable coaxial bore 37 in the end 35 of the insulating member 15 and is fixed in position by two screws 40 and 41 which extend perpendicularly of the axis of the member 15 and the sleeves 20 and 36 and which are threaded into the insulating member 15 and the sleeve 36. The screw 41 has a triple function, that being, first, to secure the sleeve 36 is position, second, to provide electrical connection between the automobile 10, the sleeve 36, the screw 41, the terminal 27 and the ground sleeve 26, and third, to provide a mounting for a looped retainer 42, the opposite ends of which are secured beneath the head 45 of the screw 41. The looped retainer 42 surrounds the ground sleeve 26, the insulating covering 25 and the conductor 21 and firmly mounts these parts in position adjacent the aerial.

The aerial mount 12 is secured to the trunk of the automobile by means of a screw 50, the head 51 of which bears against the trunk 52 of the automobile and the threaded portion 55 of which is threaded into the sleeve 36 and extends through the trunk 52. The aerial 11 is fixed in position in the sleeve 20 by means of a nut 60 which is threaded onto the aerial 11 and which bears against the aerial 11 and the sleeve 20.

Referring now to FIGS. 3 and 4, there is illustrated an alternative embodiment of the invention which is intended for mounting on the gutter 100 of the roof 101 of an automobile. The gutter 100 has apertures therethrough which receive screws 102 for mounting the triangular shaped member 105 of the aerial mount 106 on the gutter 100. The upper half of the aerial mount 106 is generally similar to or identical to the above described aerial mount. That is, the aerial 107, nut 108, sleeve 109, screw 110 and terminal 111 are all assembled in exactly the same fashion as described above in connection with FIG. 2 as regards the aerial 11, nut 60, sleeve 20, screw 30 and terminal 22, respectively. The aerial mount 106, however, includes an insulating member 115 which is rounded off not only at its upper end 116 but also at its lower end 117. The lower end 117 of the insulating member 115 is slotted at 120 to receive the triangular shaped member 105. The triangular shaped member 105 is electrically conductive and provides a path to ground for the ground sleeve 120 through the terminal 121 secured to the ground sleeve, a bracing screw 122, the triangular shaped member 105 and the gutter 125.

The brace or bracing screw 122 is threaded into the triangular shaped member 105 and has a cushioning plastic element 125 threaded to one end thereof. The position of this cushioning plastic element 125 can be adjusted by threading the screw 122 rightwardly or leftwardly as viewed in FIG. 4 in the triangular shaped member 105. A nut 126 is provided for firmly setting the position of the screw 122 by tightening the nut down against the triangular shaped member 105 with the terminal 121 therebetween.

The triangular shaped member 105 has a right triangle shape with one of the shorter sides 130 receiving the screws 102. The hypotenuse 131 of the right triangular shape and the other shorter side 132 form a pointed projection upon which the insulating member 115 is secured by means of a bolt 135. A further screw 140 secures a looped retainer 141 to the insulating member 115 by extending threadedly into the insulating member and through the ends of the looped retainer 141. The conductor 145 with its insulator 146 and ground sleeve 120 is secured in position by the looped retainer 141.

It will be evident from the above description that the present invention provides an improved aerial mount. It will be evident that the aerial mount of the present invention can be manufactured at low cost and can be easily and quickly assembled, yet provides a rugged construction capable of long and effective service.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An aerial mount for an automobile or the like comprising an insulating member having a bore therein, an electrically-conductive internally-threaded sleeve press fitted within said bore, an electrically-conductive enlarged-headed screw threaded into said insulating member and into said sleeve and providing means firmly securing said sleeve to said insulating member, said screw also being operable to secure a terminal on an electrical conductor to said insulating member underneath the head of said screw to provide electrical connection between the electrical conductor and said sleeve, a second enlarged-headed screw threaded into said insulating member, a looped retainer element having opposite ends received under the head of the second screw, said retainer element being adapted to grip a ground sleeve and an insulating covering around said electrical conductor, and means for securing the insulating member to the automobile.

2. An aerial mount for an automobile or the like comprising an insulating member having a bore therein, an electrically-conductive internally-threaded sleeve press fitted within said bore, an electrically-conductive enlarged-headed screw threaded into said insulating member and into said sleeve and providing means firmly securing said sleeve to said insulating member, an electrical conductor having a terminal thereon, said terminal being electrically connected to said sleeve by being received under the head of said screw, an insulating covering surrounding a portion of said conductor removed from said terminal, a ground sleeve surrounding a portion of said insulating covering, said ground sleeve having a terminal thereon, a second enlarged-headed screw threaded into said insulating member, a looped retainer element having opposite ends received under the head of the second screw, said ground sleeve extending through the looped retainer element whereby the ground sleeve and insulating covering and conductor are retained in place, and means for securing the insulating member to the automobile.

3. The invention of claim 2 additionally comprising an externally-threaded aerial threaded into said sleeve, a nut received on said externally-threaded aerial and bearing against said sleeve to firmly mount said aerial in said sleeve.

4. The invention of claim 2 wherein said insulating member has a further bore therein, a further sleeve press fitted within said further bore, said second screw being electrically conductive and being threaded into said further sleeve and providing means firmly securing said further sleeve to said insulating member, the terminal of said ground sleeve being received under the head of said second screw, said means for securing the insulating member to the automobile comprising a screw threaded axially into said further sleeve.

5. The invention of claim 2 additionally comprising a right triangular shaped electrically-conductive member having a hypotenuse side and two shorter sides, one of said shorter sides being provided with threaded apertures for securing said right triangular shaped member to the gutter of an automobile roof, said insulating member being slotted to receive the portion of said right triangular member away from said apertured side, an electrically-conductive bolt extending through and securing together said insulating member and said right triangular member, a brace screw threaded into and extending through said triangular shaped member, a cushioning plastic element received on the end of said screw and adapted to engage the roof of the automobile, a nut threadedly received on said brace screw and holding said ground sleeve terminal against said triangular element.

6. The invention of claim 4 wherein said insulating member has a generally cylindrical configuration which is rounded off adjacent said first mentioned sleeve, said sleeves being positioned coaxially relative to said cylindrical configuration, a third screw threaded into said insulating member and into said further sleeve and providing means firmly securing said further sleeve to said insulating member, each of said first and second and third screws being arranged perpendicularly to the axis of said insulating member.

7. The invention of claim 5 wherein said insulating member has a generally cylindrical configuration which is rounded off at its opposite ends, said sleeve being positioned coaxially relative to said cylindrical configuration, said first screw being arranged perpendicularly to the axis of said insulating member.

References Cited

UNITED STATES PATENTS 3,166,751   1/1965   Roll _____ 343—749

ELI LIEBERMAN, *Primary Examiner.*